United States Patent
Chen et al.

(10) Patent No.: US 11,898,902 B1
(45) Date of Patent: Feb. 13, 2024

(54) SWIM BLADDER BIONIC AMPHIBIOUS OPTICAL FIBER OCEAN ACOUSTIC SENSOR

(71) Applicants: QINGDAO INNOVATION AND DEVELOPMENT CENTER OF HARBIN ENGINEERING UNIVERSITY, Qingdao (CN); HARBIN ENGINEERING UNIVERSITY, Harbin (CN)

(72) Inventors: Yongyao Chen, Qingdao (CN); Xin Wang, Harbin (CN); Junjie Li, Qingdao (CN); Zedong Ma, Harbin (CN); Liang Zhang, Harbin (CN)

(73) Assignees: OINGDAO INNOVATION AND DEVELOPMENT CENTER OF HARBIN ENGINEERING UNIVERSITY, Qingdao (CN); HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 18/448,511

(22) Filed: Aug. 11, 2023

(30) Foreign Application Priority Data

Feb. 24, 2023 (CN) .......................... 202310158404.2

(51) Int. Cl.
*G01V 1/18* (2006.01)
*G01H 9/00* (2006.01)
*G01V 1/38* (2006.01)

(52) U.S. Cl.
CPC ............. *G01H 9/004* (2013.01); *G01V 1/188* (2013.01); *G01V 1/38* (2013.01)

(58) Field of Classification Search
CPC ........... G01H 9/004; G01V 1/188; G01V 1/38
See application file for complete search history.

(56) References Cited

U.S. PATENT DOCUMENTS

| | | | | |
|---|---|---|---|---|
| 2005/0062979 A1* | 3/2005 | Zhu | ........................ | G01L 9/0079 356/480 |
| 2008/0049230 A1* | 2/2008 | Chin | ...................... | G01H 9/004 356/480 |

(Continued)

FOREIGN PATENT DOCUMENTS

| | | |
|---|---|---|
| CN | 201075028 Y | 6/2008 |
| CN | 103492842 A | 1/2014 |

(Continued)

OTHER PUBLICATIONS

Wang Fuyin, "Study on the key technology of extrinsic Fabry-Perot interferometer-based miniature fiber underwater acoustic sensing," May 2015, A dissertation Submitted in partial fulfillment of the requirements for the degree of Doctor of Engineering in Optical Engineering. (English language abstract on e-pp. 17-19).

(Continued)

*Primary Examiner* — Krystine E Breier
(74) *Attorney, Agent, or Firm* — Rachel Pilloff; Sean Passino; Martin Cosenza

(57) ABSTRACT

Provided is a swim bladder bionic amphibious optical fiber ocean acoustic sensor, belonging to the field of optical fiber ocean sensors, consisting of a sound sensitive diaphragm, a diaphragm supporting shell, a section of coated optical fiber, a single-hole optical fiber sleeve and a single-mode optical fiber. An upper surface of the supporting shell is provided with two symmetrical overflow holes, and a structure includes a back cavity communicated with the overflow holes. A medium in the back cavity of the sensor may be replaced by inflating, deflating and filling water through the overflow holes, to achieve impedance matching with external environments. When the back cavity is inflated, the sensor serves as a fiber-optic microphone, and when the back cavity is deflated and filled with water, the sensor (Continued)

serves as a fiber-optic hydrophone. The working states could be switched flexibly to achieve a working mode like a swim bladder.

5 Claims, 23 Drawing Sheets

(56) References Cited

U.S. PATENT DOCUMENTS

| | | | |
|---|---|---|---|
| 2011/0305116 A1 | 12/2011 | Lagakos et al. | |
| 2012/0170422 A1* | 7/2012 | Moon | G01V 1/188 367/166 |
| 2014/0036635 A1 | 2/2014 | Launay et al. | |
| 2021/0099793 A1* | 4/2021 | Shams | H04R 31/003 |

FOREIGN PATENT DOCUMENTS

| | | |
|---|---|---|
| CN | 111044137 A | 4/2020 |
| CN | 112781713 A | 5/2021 |
| CN | 112945860 A | 6/2021 |
| CN | 113405721 A | 9/2021 |
| CN | 115493683 A | 12/2022 |
| JP | 2003130722 A | 5/2003 |

OTHER PUBLICATIONS

Nguyen Minh-Dung et al., "A Hydrophone Using Liquid to Bridge the Gap of a Piezo-Resistive Cantilever," Transducers, Jun. 2013.
First Search Report for China Application No. 202310158404.2.
Supplementary Search Report for China Application No. 202310158404.2.
Office Action for China Application No. 202310158404.2, dated Apr. 14, 2023.
Notice to Grant for China Application No. 202310158404.2, dated May 31, 2023.

* cited by examiner

SWIM BLADDER BIONIC AMPHIBIOUS OPTICAL FIBER OCEAN ACOUSTIC SENSOR

CROSS-REFERENCE TO RELATED APPLICATIONS

This disclosure claims priority of Chinese Patent Application No. 202310158404.2, filed on Feb. 24, 2023, the contents of which are hereby incorporated by reference.

TECHNICAL FIELD

The disclosure belongs to the field of optical fiber ocean sensors, and in particular to a swim bladder bionic amphibious optical fiber ocean acoustic sensor.

BACKGROUND

As one of important supports for developing marine science and technology, marine observation technology plays an extremely important role in developing marine resources, protecting marine environment, preventing marine disasters and strengthening the safety of sea areas. As the most important part of the marine observation technology, the rapid development of ocean sensors will vigorously promote the revolutionary change of marine observation technology. In recent years, marine observation has gradually transitioned from shallow sea to deep sea, from single variable to multivariate, and from single point to networking. An optical fiber acoustic sensor has become one of important research directions in acoustic detection and marine detection technology in recent years because of its high sensitivity, large dynamic range, strong anti-electromagnetic interference ability, flexible structural design, suitable for long-distance and large-range observation, easy to arrange into array and simultaneous measurement of multiple parameters.

Optical fiber sensors also play an important role in many key fields, such as medical care, earthquake monitoring, structural non-destructive testing, oil and gas exploration and ultrasonic testing in underwater detection and communication. Among many optical fiber sensors, Fabry-Perot cavity (FP) optical fiber acoustic sensors have attracted much attention because of high sensitivity, simple structure, wide range of adjustable cavity length and possibility of miniaturization structure design. At present, researches on the FP optical fiber acoustic sensors mainly focus on fiber-optic microphone and fiber-optic hydrophone.

An FP fiber-optic microphone is mainly used for acoustic signal detection on land. There is a cavity filled with air in this fiber-optic microphone. If the microphone is directly used underwater, it will lead the deformation or even damage of an FP sound-sensitive film, thus seriously affecting the working states of the sensor. Therefore, at present, the working environment of a fiber-optic microphone is limited to air, and the fiber-optic microphone may not be directly used underwater. On the other hand, for the FP fiber-optic hydrophone, a closed FP cavity structure will be affected by different hydrostatic pressures caused by the change of underwater working depths, causing hydrostatic pressure deformation in the FP cavity of the fiber-optic hydrophone, resulting in drastic changes in its optical characteristics, and making the FP fiber-optic hydrophone unable to work stably underwater. It is worth noting that the current FP fiber-optic microphones and the fiber-optic hydrophones may only work in a single environment, which are confined to air or underwater, so the amphibious functions may not be achieved. Therefore, it is necessary to develop a multifunctional amphibious optical fiber acoustic sensor that may flexibly switch the working states. This sensor may significantly reduce the use cost of this sensor and have the advantage of water-air cross-border use.

SUMMARY

In view of this, an objective of the disclosure is to propose a swim bladder bionic amphibious optical fiber ocean acoustic sensor capable of flexibly switching different working states by inflating or filling water in a cavity (inside the sensor), and realizing a high-performance and low-cost optical fiber acoustic sensor that may be used both underwater and on land.

In order to achieve the above objective, the disclosure adopts a following technical scheme. A swim bladder bionic amphibious optical fiber ocean acoustic sensor consists of a plurality of overflow holes, a back cavity, a diaphragm supporting shell, a single-hole optical fiber sleeve, a coated optical fiber and a single-mode optical fiber. A groove is arranged at a top of the diaphragm supporting shell, the groove is matched with the diaphragm outer frame, and the diaphragm outer frame is provided with the sound sensitive diaphragm. The back cavity is located in the diaphragm supporting shell, the top of the diaphragm supporting shell is provided with the overflow holes on an outer side of the groove, and the plurality of overflow holes are communicated with the back cavity. The single-hole optical fiber sleeve is installed at a bottom of the diaphragm supporting shell, a head of the coated optical fiber passes through the single-hole optical fiber sleeve and extends into the back cavity, and a tail end of the coated optical fiber is connected with the single-mode optical fiber.

In an embodiment, the sound sensitive diaphragm is a square with a size of 0.5 mm×0.5 mm-1 mm×1 mm and a thickness of 200 nm-500 nm, and the diaphragm outer frame is a square with a size of 5 mm×5 mm and a thickness of 200 µm.

In an embodiment, the diaphragm supporting shell has an overall diameter of 8 mm-12 mm, a height of 5 mm-10 mm, and the groove at the top has a size of 5.1 mm×5.1 mm×0.2 mm.

In an embodiment, a number of the overflow holes is 1-4, each of the overflow holes has a diameter of 0.2 mm-1 mm, a hole length of 0.5 mm-10 mm, and the back cavity has a volume of mm³.

In an embodiment, a working frequency of the sensor is 500 Hz-4 kHz. The sound sensitive diaphragm is a square with a size of 0.5 mm×0.5 mm and a thickness of 200 nm, and the diaphragm outer frame is a square with a size of 5 mm×5 mm and a thickness of 200 µm. The diaphragm supporting shell has an overall diameter of 10 mm, a height of 5.5 mm, and the groove at the top has a size of 5.1 mm×5.1 mm×0.2 mm. Each of the overflow holes has a diameter of 0.5 mm, a hole length of 1 mm, and an internal volume of the diaphragm supporting shell is 85 mm³.

In an embodiment, a working frequency of the sensor is 800 Hz-10 kHz. The sound sensitive diaphragm is a square with a size of 0.5 mm×0.5 mm and a thickness of 230 nm, and the diaphragm outer frame is a square with a size of 5 mm×5 mm and a thickness of 200 µm. The diaphragm supporting shell has an overall diameter of 10 mm, a height of 5.5 mm, and the groove at the top has a size of 5.1 mm×5.1 mm×0.2 mm. Each of the overflow holes has a diameter of mm, a hole length of 0.1 mm, and an internal volume of the diaphragm supporting shell is 85 mm³.

In an embodiment, a working frequency of the sensor is 1 kHz-20 kHz. The sound sensitive diaphragm is a square with a size of 0.5 mm×0.5 mm and a thickness of 200 nm, and the diaphragm outer frame is a square with a size of 5 mm×5 mm and a thickness of 200 μm. The diaphragm supporting shell has an overall diameter of 10 mm, a height of 5.5 mm, and the groove at the top has a size of 5.1 mm×5.1 mm×0.2 mm. Each of the overflow holes has a diameter of 1 mm, a hole length of 1 mm, and an internal volume of the diaphragm supporting shell is 435 mm³.

In an embodiment, a working frequency of the sensor is 2 kHz-30 kHz. The sound sensitive diaphragm is a square with a size of 0.5 mm×0.5 mm and a thickness of 500 nm, and the diaphragm outer frame is a square with a size of 5 mm×5 mm and a thickness of 200 μm. The diaphragm supporting shell has an overall diameter of 10 mm, a height of 5.5 mm, and the groove at the top has a size of 5.1 mm×5.1 mm×0.2 mm. Each of the overflow holes has a diameter of 0.5 mm, a hole length of 1 mm, and an internal volume of the diaphragm supporting shell is 85 mm³.

In an embodiment, the sound sensitive diaphragm is made of low-stress silicon nitride, and the diaphragm outer frame is made of silicon.

In an embodiment, the diaphragm supporting shell is made of hard plastic or ceramic.

Compared with the prior art, the swim bladder bionic amphibious optical fiber ocean acoustic sensor has following beneficial effects.

Firstly, a medium in the back cavity of the optical fiber ocean acoustic sensor provided by the disclosure may be conveniently replaced by inflating, deflating and filling water through the overflow holes, so as to achieve good impedance matching with an external environment. When the back cavity is inflated, the sensor serves as a fiber-optic microphone, and when the back cavity is deflated and filled with water, the sensor serves as a fiber-optic hydrophone. Therefore, the working states may flexibly switch. The sensor breaks through the limitation that the existing Fabry-Perot (FP) fiber-optic microphones and fiber-optic hydrophones may only work in a single environment, and finally achieves the objective of amphibious use with a working principle of swim bladder-like.

Secondly, according to the optical fiber ocean acoustic sensor provided by the disclosure, a resonance peak position of the sensor an acoustic response curve may be adjusted by changing the size and the hole length of each of the overflow holes, the volume of the back cavity and diaphragm specifications, so the sensor has certain flexibility in design for actual needs.

Thirdly, the optical fiber ocean acoustic sensor provided by the disclosure has advantages of high sensitivity, low self-noise, small volume, low cost, good pressure resistance and stable optical performance, is convenient for mass production and capable of realizing cross-media acoustic detection and communication, and is expected to be applied in fields of underwater acoustic detection, underwater communication, airborne acoustic measurement and cross-media acoustic detection and communication.

BRIEF DESCRIPTION OF THE DRAWINGS

The drawings constituting a part of the disclosure are used to provide a further understanding of the disclosure, and illustrative embodiments of the disclosure and their descriptions are used to explain the disclosure, and do not constitute an improper limitation of the disclosure. The drawings are as follows.

DETAILED DESCRIPTION OF THE EMBODIMENTS

Figure 1:
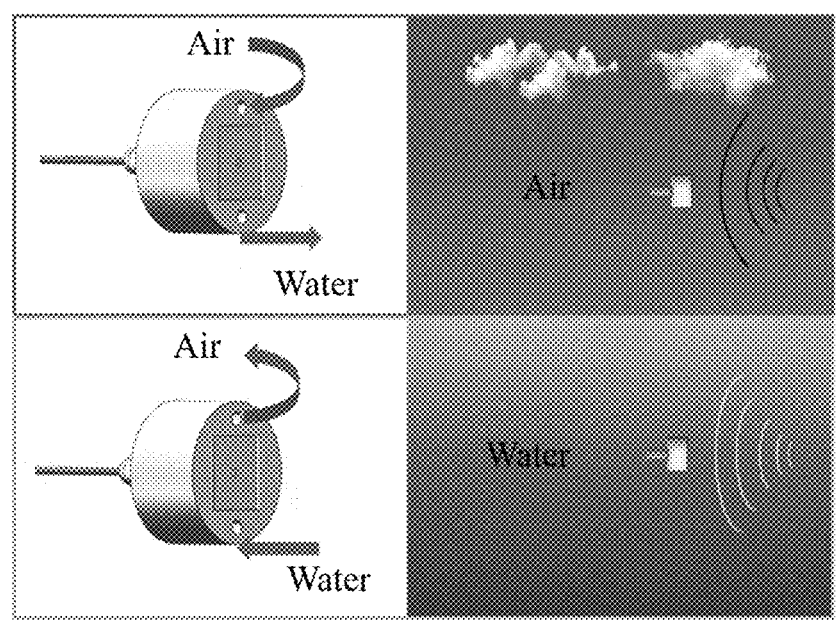
FIG. 1 is a design idea of a schematic diagram of a swim bladder bionic amphibious optical fiber ocean acoustic sensor according to the disclosure, and is mainly a schematic diagram of working state switching of the sensor through inflation, deflation and water filling.

In the following, technical schemes in embodiments of the disclosure will be clearly and completely explained with the attached drawings. It should be noted that, in a case of no conflict, the embodiments in the disclosure and features in the embodiments may be combined with each other, and the described embodiments are only a part of the embodiments of the disclosure, but not all of them.

I. Embodiment 1 is illustrated with reference to FIGS. 1-12. A swim bladder bionic amphibious optical fiber ocean acoustic sensor includes a sound sensitive diaphragm 1, a diaphragm outer frame 2, a plurality of overflow holes 3, a back cavity 4 communicated with the overflow holes, a diaphragm supporting shell 5, a single-hole optical fiber sleeve 6, a coated optical fiber 7 and a single-mode optical fiber 8. A groove is arranged at a top of the diaphragm supporting shell 5, the groove is matched with the diaphragm outer frame 2, and the diaphragm outer frame 2 is provided with the sound sensitive diaphragm 1. The back cavity 4 is located inside the diaphragm supporting shell 5, the top of the diaphragm supporting shell 5 is provided with the overflow holes 3 on an outer side of the groove, and the plurality of overflow holes 3 are communicated with the back cavity 4. The single-hole optical fiber sleeve 6 is installed at a bottom of the diaphragm supporting shell 5, a head of the coated optical fiber 7 passes through the single-hole optical fiber sleeve 6 and extends into the back cavity 4, and a tail end of the coated optical fiber 7 is connected with the single-mode optical fiber 8. The tail end of the coated optical fiber 7 is fused with the single-mode optical fiber 8 by a fusion splicer and then communicated with outside. The single-hole optical fiber sleeve 6 is a single-hole glass capillary.

The sound sensitive diaphragm 1 is a square with a size of 0.5 mm×0.5 mm-1 mm×1 mm and a thickness of 200 nm-500 nm, and the diaphragm outer frame 2 is a square with a size of 5 mm×5 mm and a thickness of 200 μm.

The diaphragm supporting shell 5 has an overall diameter of 8 mm-12 mm, a height of 5 mm-10 mm, and the groove at the top has a size of 5.1 mm×5.1 mm×0.2 mm.

A number of the overflow holes 3 is 1-4, each of the overflow holes has a diameter of 0.2 mm-1 mm, a hole length of 0.5 mm-10 mm, and the back cavity 4 has a volume of 20-400 mm$^3$.

The sound sensitive diaphragm 1 is made of silicon nitride with low stress, and the diaphragm outer frame 2 is made of silicon. The diaphragm supporting shell 5 is made of hard plastic or ceramic.

Embodiment 1

A working frequency of the sensor is 500 Hz-4 kHz. A sound sensitive diaphragm 1 is a square with a size of 0.5 mm×0.5 mm and a thickness of 200 nm, and a diaphragm outer frame 2 is a square with a size of 5 mm×5 mm and a thickness of 200 μm. A diaphragm supporting shell 5 has an overall diameter of 10 mm, a height of 5.5 mm, and a groove at a top has a size of 5.1 mm×mm×0.2 mm. Each of the overflow holes 3 has a diameter of 0.5 mm, a hole length of 1 mm, and a back cavity 4 has a volume of 85 mm$^3$.

Embodiment 2

A working frequency of the sensor is 800 Hz-10 kHz. A sound sensitive diaphragm 1 is a square with a size of 0.5 mm×0.5 mm and a thickness of 230 nm, and a diaphragm outer frame 2 is a square with a size of 5 mm×5 mm and a thickness of 200 μm. A diaphragm supporting shell 5 has an overall diameter of 10 mm, a height of 5.5 mm, and a groove at a top has a size of 5.1 mm×mm×0.2 mm. Each of the overflow holes 3 has a diameter of 0.8 mm, a hole length of 0.1 mm, and a back cavity 4 has a volume of 85 mm$^3$.

Embodiment 3

A working frequency of the sensor is 1 kHz-20 kHz. A sound sensitive diaphragm 1 is a square with a size of 0.5 mm×0.5 mm and a thickness of 200 nm, and a diaphragm outer frame 2 is a square with a size of 5 mm×5 mm and a thickness of 200 μm. A diaphragm supporting shell 5 has an overall diameter of 10 mm, a height of 5.5 mm, and a groove at a top has a size of 5.1 mm×5.1 mm×0.2 mm. Each of the overflow holes 3 has a diameter of 1 mm, a hole length of 1 mm, and a back cavity 4 has a volume of 435 mm$^3$.

Embodiment 4

A working frequency of the sensor is 2 kHz-30 kHz. A sound sensitive diaphragm 1 is a square with a size of 0.5 mm×0.5 mm and a thickness of 500 nm, and a diaphragm outer frame 2 is a square with a size of 5 mm×5 mm and a thickness of 200 μm. A diaphragm supporting shell 5 has an overall diameter of 10 mm, a height of 5.5 mm, and a groove at a top has a size of 5.1 mm×5.1 mm×0.2 mm. Each of the overflow holes 3 has a diameter of 0.5 mm, a hole length of 1 mm, and a back cavity 4 has a volume of 85 mm$^3$.

As shown in FIG. 1, a swim bladder bionic amphibious optical fiber ocean acoustic sensor according to the disclosure draws lessons from an idea of switching working states of a swim bladder, and a design of overflow holes 3 may conveniently switch an internal medium of the sensor to achieve a purpose of impedance matching with an external working environment, so as to flexibly switch the working states. FIG. 1 is a schematic diagram of the optical fiber ocean acoustic sensor applied in different working environments after changing the internal medium. When a back cavity 4 inside the sensor is inflated, the sensor acts as a fiber-optic microphone for acoustic detection and communication in air. When the back cavity 4 inside the sensor is filled with water, the sensor acts as a fiber-optic hydrophone for underwater acoustic detection and communication.

Figure 2:
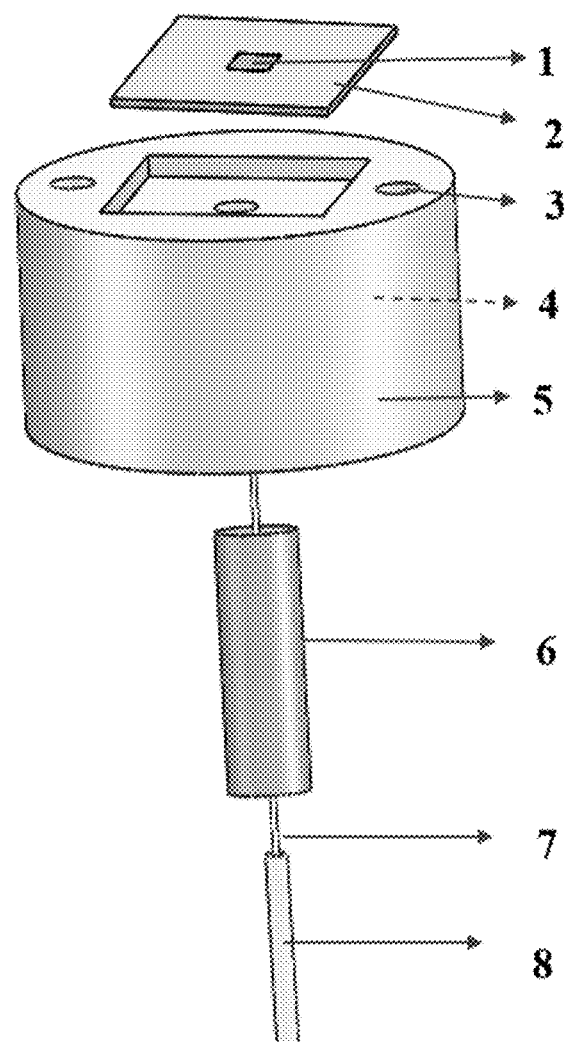
FIG. 2 is a composition structure schematic diagram of a swim bladder bionic amphibious optical fiber ocean acoustic sensor according to the disclosure.
Figure 3:
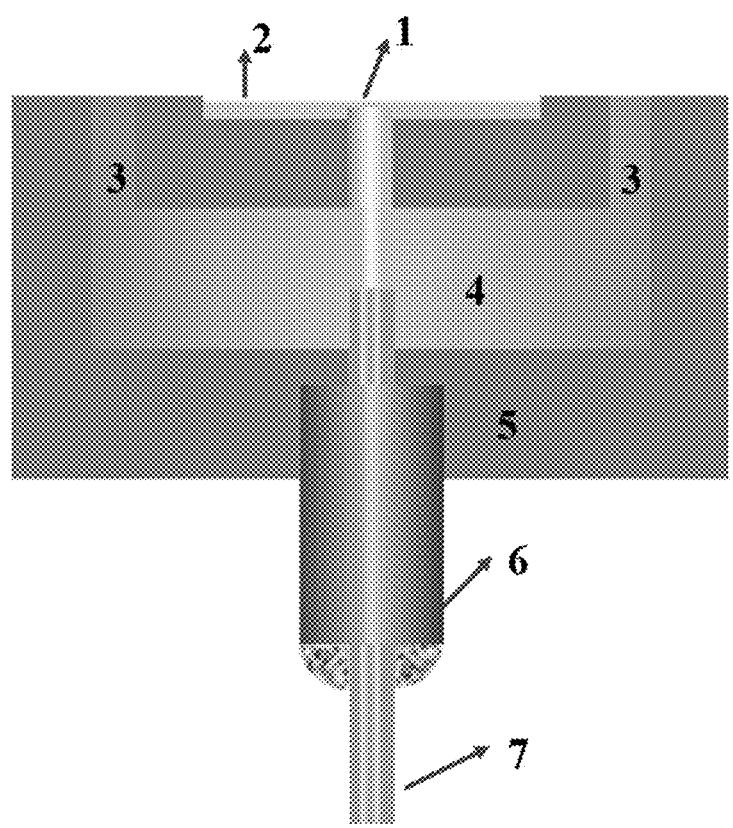
FIG. 3 is a front view of a swim bladder bionic amphibious optical fiber ocean acoustic sensor according to the disclosure.
Figure 4:
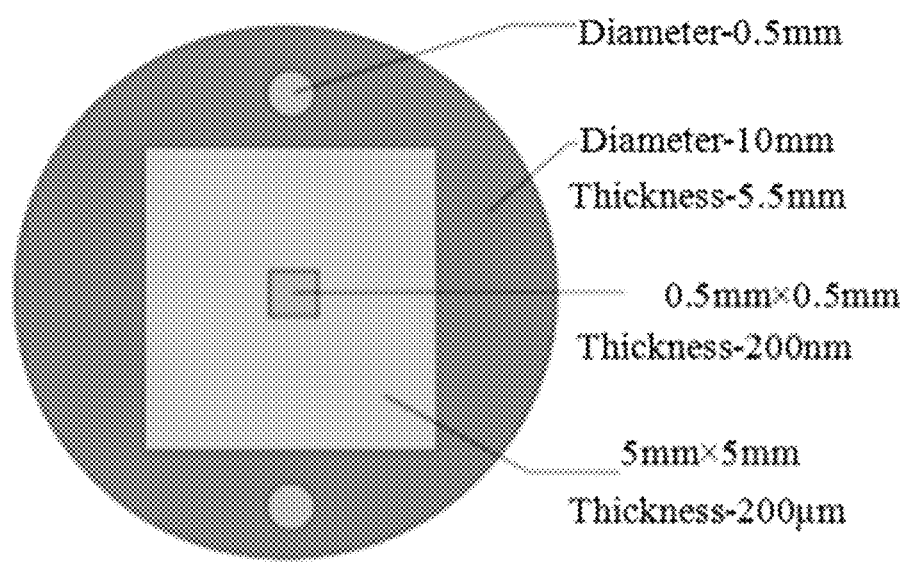
FIG. 4 is a top view of a swim bladder bionic amphibious optical fiber ocean acoustic sensor according to the disclosure.

FIGS. 2-4 show structural schematic diagrams of a swim bladder bionic amphibious optical fiber ocean acoustic sensor according to the disclosure. The optical fiber ocean acoustic sensor consists of a sound sensitive diaphragm 1, a peripheral diaphragm outer frame 2, two symmetrical overflow holes 3 on an upper surface of a diaphragm supporting shell 5, a back cavity 4 communicating with the overflow holes 3 for releasing pressure, a section of coated optical fiber 7, a single-hole optical fiber sleeve 6 and a single-mode optical fiber 8. The diaphragm outer frame 2 is glued in a groove at a top of the diaphragm supporting shell 5 by Ultraviolet (UV) glue, and the top of the diaphragm supporting shell 5 has the two symmetrical overflow holes 3, which are communicated with the back cavity 4 inside the diaphragm supporting shell 5. The single-hole optical fiber sleeve 6 is fixed at a bottom of the supporting shell 5 for clamping the coated optical fiber, and a tail end of the coated optical fiber 7 is fused with the single-mode optical fiber 8 by a fusion splicer.

A Fabry-Perot (FP) interference cavity is formed between a head end face of the coated optical fiber 7 and the sound sensitive diaphragm. When sound waves are incident, sound pressure causes the sound sensitive diaphragm 1 deformation and a cavity length of the FP cavity changes. Incident sound pressure is obtained by demodulating the change of cavity length. The overflow holes 3 are capable of improving an ability of the sensor to resist hydrostatic pressure, and an internal medium of the back cavity 4 may be replaced through the overflow holes 3, so as to realize switching different working states of the optical fiber ocean acoustic sensor and achieve a purpose of amphibious use.

Figure 5:
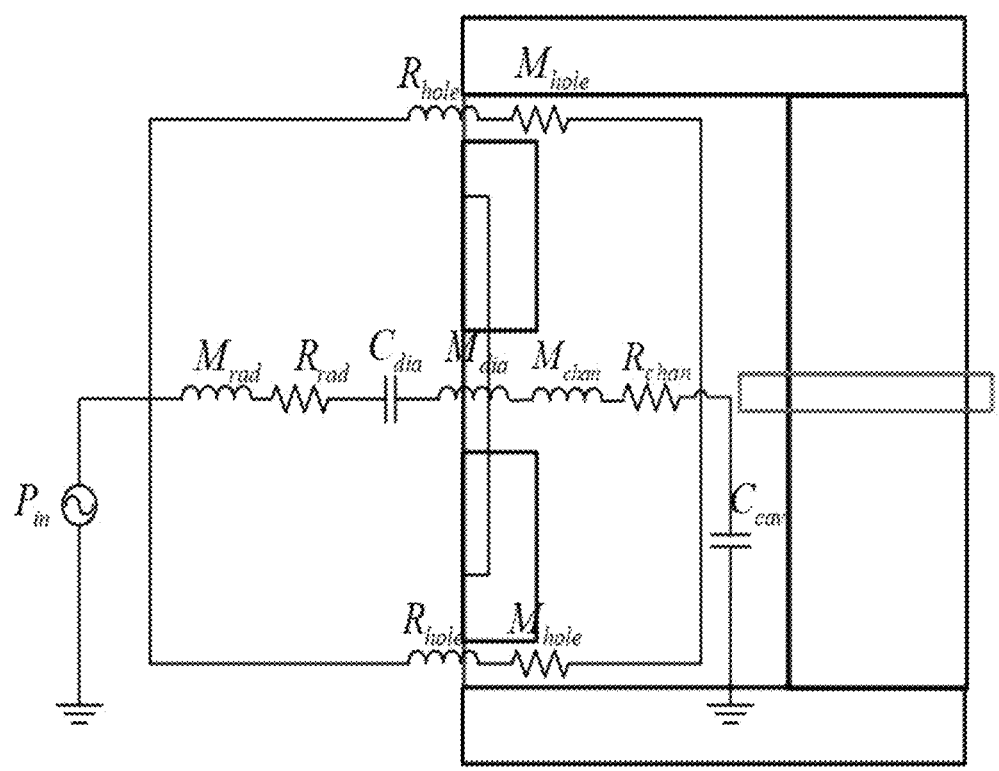
FIG. 5 is a schematic diagram of a lumped parameters equivalent circuit model of a swim bladder bionic amphibious optical fiber ocean acoustic sensor according to the disclosure.

FIG. 5 shows a lumped parameters equivalent circuit diagram of a swim bladder bionic amphibious optical fiber ocean acoustic sensor according to the disclosure. In order to accurately analyze resonance characteristics of the optical fiber ocean acoustic sensor, when a characteristic size of the acoustic sensor is much smaller than a wavelength of sound wave, propagation characteristics of sound waves may be ignored, and motion of each part of the acoustic system may be directly regarded as uniform, so that an acoustic vibration system may be regarded as a lumped parameter model, and the equivalent circuit diagram similar to an electrical system may be used for an analysis. The lumped parameter model has important guiding significance for selection of sensor structural parameters.

The sensitivity of an FP optical fiber ocean acoustic sensor is determined by two parts. As shown in a formula (1), a first part of the FP sensor response is mechanical sensitivity, and a second part is optical sensitivity. The mechanical sensitivity part (a first term ME part on the right of the formula 1) is mainly determined by a sound pressure response function of a sensor diaphragm and the mechanical compliance of the diaphragm itself. The sound pressure response function of the sensor diaphragm is explained and calculated in detail in a following equivalent circuit analysis, which is a function related to the sensor structural parameters (including the diaphragm) and acoustic frequency. The latter means that unit pressure exerted on the diaphragm forces the diaphragm to move, thus causing change of the cavity length, that is, the mechanical sensitivity of the diaphragm itself, which is related to the mechanical characteristics of the diaphragm such as size and material. The optical sensitivity part (a second term OP part on the right of the formula 1) is mainly determined by the change of reflected light power caused by the FP cavity length and the change of output voltage of a photoelectric demodulation signal caused by reflected light phase change. Therefore, an overall sensitivity of the sensor may be expressed as:

$$S_{sensor} = \left(\frac{dP_{dia}}{dP_{in}} \frac{dL_{cav}}{dP_{dia}}\right)_{ME} \left(\frac{dI_r}{dL_{cav}} \frac{dV_{out}}{dI_r}\right)_{OP}, \quad \text{formula (1)}$$

where $P_{in}$ is an incident sound pressure; $P_{dia}$ is a superposition pressure of incident sound pressure and radiated sound field after diaphragm vibration; $L_{cav}$ is an FP cavity length; $I_r$ is a reflected light intensity and $V_{out}$ is an output voltage. In the disclosure, an optical part may be treated as a constant because the optical characteristics of a thin film in the FP and an optical system are constant. That is, in the above expression, only the first term related to the acoustic frequency determines a spectral response characteristic curve of the sensitivity, and remaining terms only linearly scale its overall amplitude. Therefore, in numerical simulation, only the mechanical sensitivity in the sensitivity formula (1) of the sensor is considered when comparing differences of performance results caused by changes of sensor structure size and diaphragm specification parameters.

In order to simplify an analysis model, the incident sound wave may be regarded as a uniform plane wave sound field $P_{in}$, and $P_{in}$ may affect the sound field inside the sensor in two ways (see FIG. 5). A most direct way is through the overflow holes. When each of the overflow holes are subjected to the incident sound pressure, a medium in each of the overflow holes moves and radiates the sound pressure to the connected back cavity, where the kinetic energy of the medium in each of the overflow holes is described by acoustic mass $M_{hole}$, and the energy dissipation caused by hole wall friction is expressed by acoustic resistance $R_{hole}$. Another indirect way is through the sound sensitive diaphragm. Firstly, the pressure field $P_{in}$ of the incident sound wave may cause the diaphragm of the FP cavity to vibrate. The diaphragm vibration is similar to a secondary sound source, which may generate a radiated sound field and superimpose it with the external incident sound field. Sound pressure of the superimposed sound field is $P_{dia}$, and the sound pressure is a key to the diaphragm deformation. Parameters related to acoustic radiation of the diaphragm include radiation quality $M_{rad}$ and radiation resistance $R_{rad}$. A former term represents the kinetic energy of the fluid moving with the diaphragm, and a latter term represents the energy dissipation during the fluid moving. These terms represent an ability of the diaphragm as a secondary sound source to generate acoustic radiation, so these terms will also directly affect sound pressure $P_{dia}$ of the sound field after superposition. Acoustic impedance of the diaphragm itself includes not only acoustic mass $M_{dia}$, but also sound volume $C_{dia}$ of the diaphragm to describe the potential energy stored by its deformation. Similarly, a section of a channel behind the diaphragm has acoustic mass $M_{chan}$ and acoustic resistance $R_{chan}$. In the equivalent circuit, these two paths are connected in parallel to the cavity at a back of the model. Assuming that a cavity wall is rigid and does not deform when the medium is compressed and expanded, the moving medium will cause pressure in the cavity to change, so that the fluid in the cavity will store potential energy and will be expressed as acoustic compliance $C_{cav}$ in a low frequency band of interest.

Because an optical path of the sensor is only sensitive to the cavity length (the diaphragm centre displacement), in an equivalent circuit analysis of acoustic vibration system, a ratio of pressure drop $P_{dia}$ on acoustic compliance $C_{dia}$ of the diaphragm to the incident sound pressure $P_{in}$ represents a sound pressure transfer response of the sensor diaphragm. In order to calculate this value, an equivalent circuit model is divided into four impedance parts, namely $$X_1 = R_{hole} + j\omega M_{hole} X_1 = R_{hole} + j\omega M_{hole}$$

$$X_2 = R_{rad} + R_{chan} + j\omega(M_{rad} + M_{dia} + M_{chan}), X_3 = (j\omega C_{dia})^{-1},$$
$$\text{and } X_4 = (j\omega C_{cav})^{-1},$$

where $\omega$ is an angular frequency of an incident sound wave. The ratio of the pressure $P_{dia}$ on acoustic compliance $C_{dia}$ of the diaphragm to the incident sound pressure $P_{in}$ is as shown in a formula (2):

$$H_{sensor} = \frac{P_{dia}}{P_{in}} = \frac{X_1 X_3}{X_1 X_4 + (X_1 + 2X_4)(X_2 + X_3)}.$$

It should be noted here that under action of uniform external pressure load P, displacement in a normal direction of a diaphragm mode of a square diaphragm with a side length of 2a and low residual stress may be expressed as formula (3):

$$u(x, y) \cong \frac{Pa^4}{47D}\left(1 - \frac{x^2}{a^2}\right)^2 \left(1 - \frac{y^2}{a^2}\right)^2$$

In the above formula, D is flexural rigidity: $D = Eh^3/12/(1-\mu^2)$, where E and $\mu$ are Young's modulus and a Poisson's ratio of a diaphragm material respectively, and h is a thickness of the square diaphragm. The diaphragm is subjected to a harmonic sound pressure signal with an amplitude of $P_0$ and a frequency of $\omega$, that is, $P = P_0 e^{j\omega t}$. Maximum center displacement of the diaphragm is $u_0 = Pa^4/47D$. The mechanical sensitivity of the diaphragm is $S_{dia} = a^4/47D$. The mechanical sensitivity of the sensor may be obtained by multiplying $H_{sensor}$ with the mechanical sensitivity $S_{dia}$ of the diaphragm (formula 1). A sensitivity frequency response curve of the sensor may be calculated, and an influence of main size parameters of a sensor structure on a cut-off frequency, a resonance peak frequency and a usable frequency band may be predicted through an analysis of the response curve, thus providing design reference for required performance optimization.

A following table shows parameter expressions corresponding to lumped parameter elements in FIG. 5.

| FP sensor composition | Equivalent resistance R | Equivalent mass M | Equivalent capacitance C |
|---|---|---|---|
| Diaphragm | \ | $M_{dia} = \frac{25\rho h}{49a^2}$ | $C_{dia} = \frac{256a^6}{10575D}$ |
| Radiation impedance | $R_{rad} = \frac{\rho_0}{2\pi c_0}\omega^2$ | $M_{rad} = \frac{5\rho_0}{2\pi^{\frac{3}{2}} a}$ | \ |
| Hole | $R_{hole} = \frac{8\eta l_{hole}}{\pi a_{hole}^4}$ | $M_{hole} = \frac{4}{3}\frac{\rho_0 l_{hole}}{\pi a_{hole}^2}$ | \ |
| Cavity | $C_{cav} = \frac{V}{\rho_0 c_0^2}$ | \ | \ |
| Channel | $R_{chan} = \frac{8\eta l_{chan}}{\pi a_{chan}^4}$ | $M_{hole} = \frac{4}{3}\frac{\rho_0 l_{chan}}{\pi a_{chan}^2}$ | \ |

In the table, $\rho$ is a density of the diaphragm material; $\rho_0$ is a density of the medium in the back cavity; $c_0$ is a sound velocity of the medium in the back cavity; $\eta$ is a fluid shear viscosity coefficient; $l_{hole}$ is the hole length; $a_{hole}$ is a hole radius; V is a back cavity volume; $l_{chan}$ is a channel length; $a_{chan}$ is a channel radius.

Figure 6A:
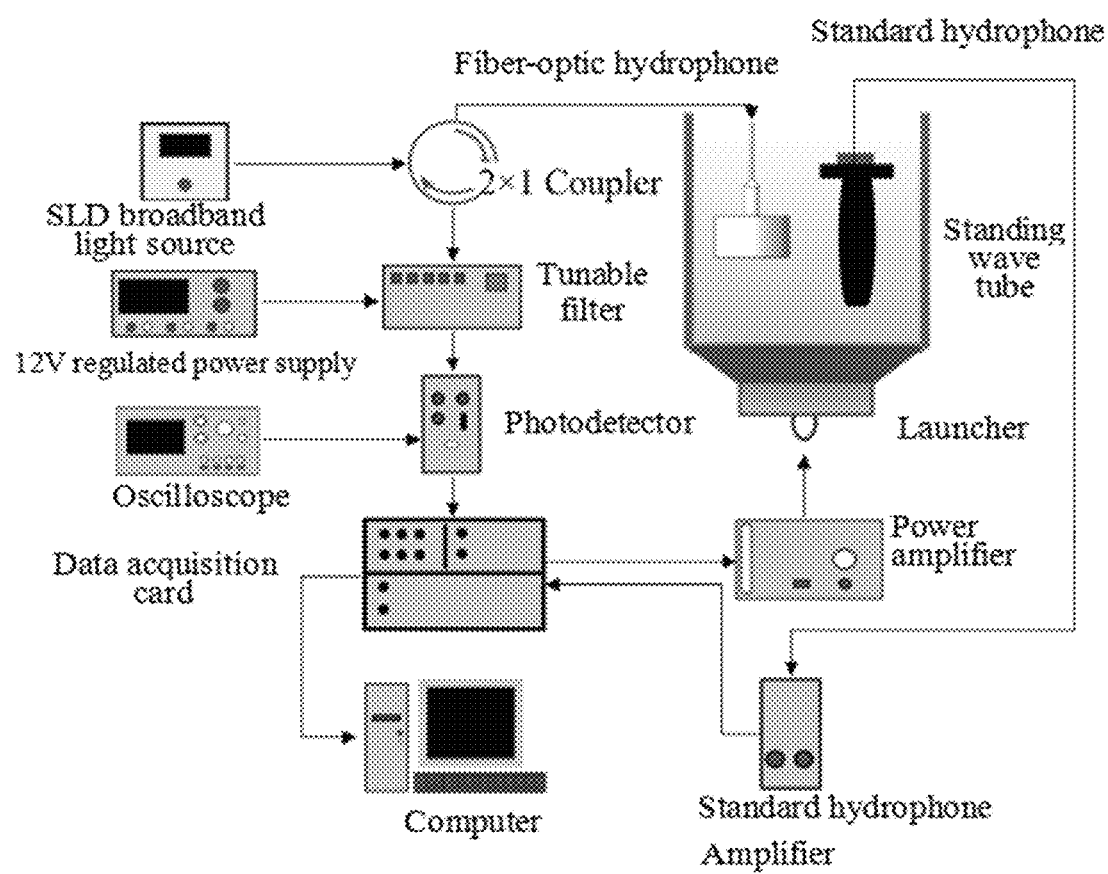
FIG. 6A is a schematic diagram of an underwater test device of a swim bladder bionic amphibious optical fiber ocean acoustic sensor according to the disclosure.
Figure 6B:
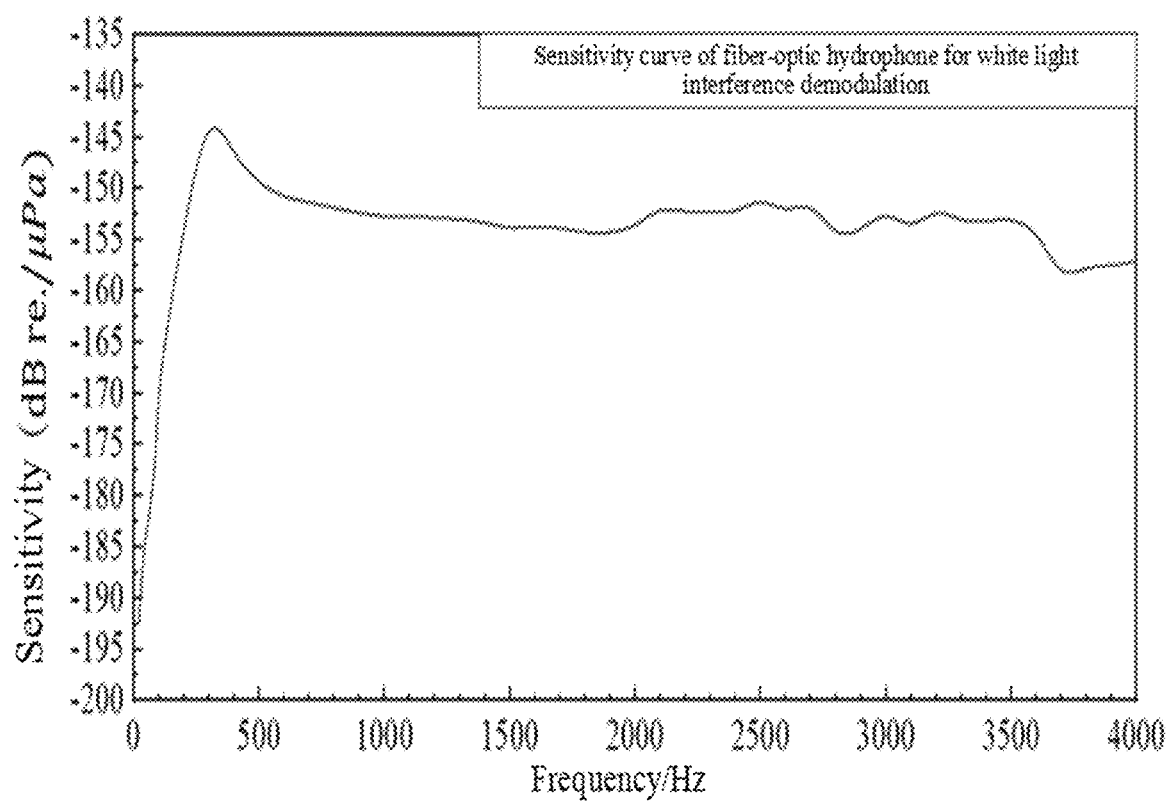
FIG. 6B is a sensitivity curve of a swim bladder bionic amphibious optical fiber ocean acoustic sensor according to the disclosure as a fiber-optic hydrophone in an underwater test.
Figure 7A:
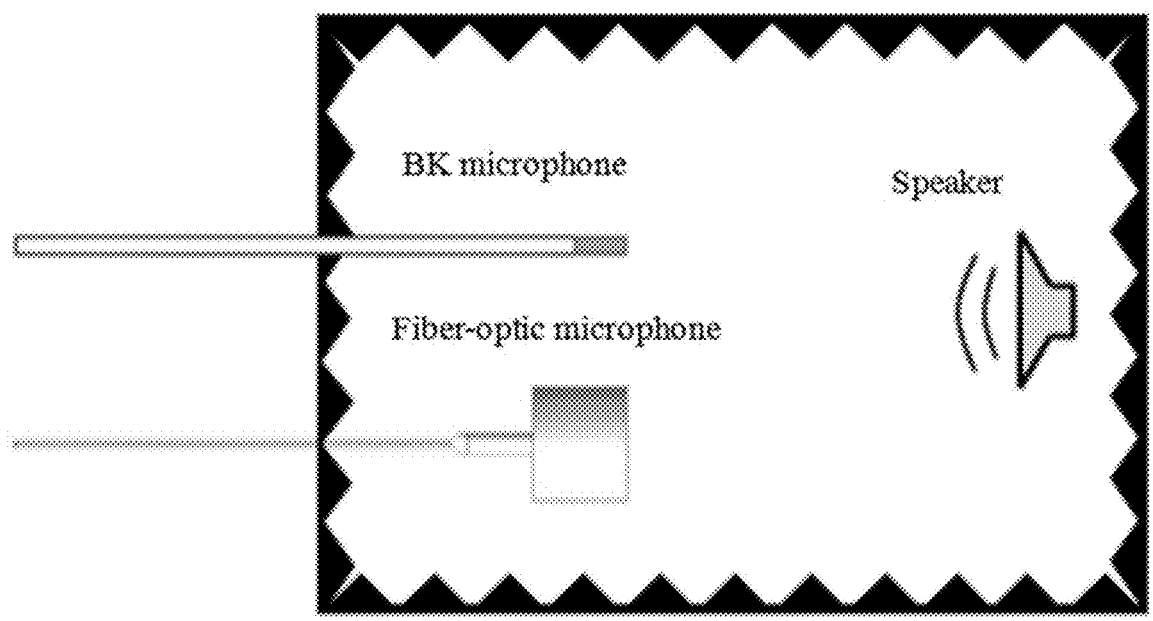
FIG. 7A is a schematic diagram of a test device in air of a swim bladder bionic amphibious optical fiber ocean acoustic sensor according to the disclosure.
Figure 7B:
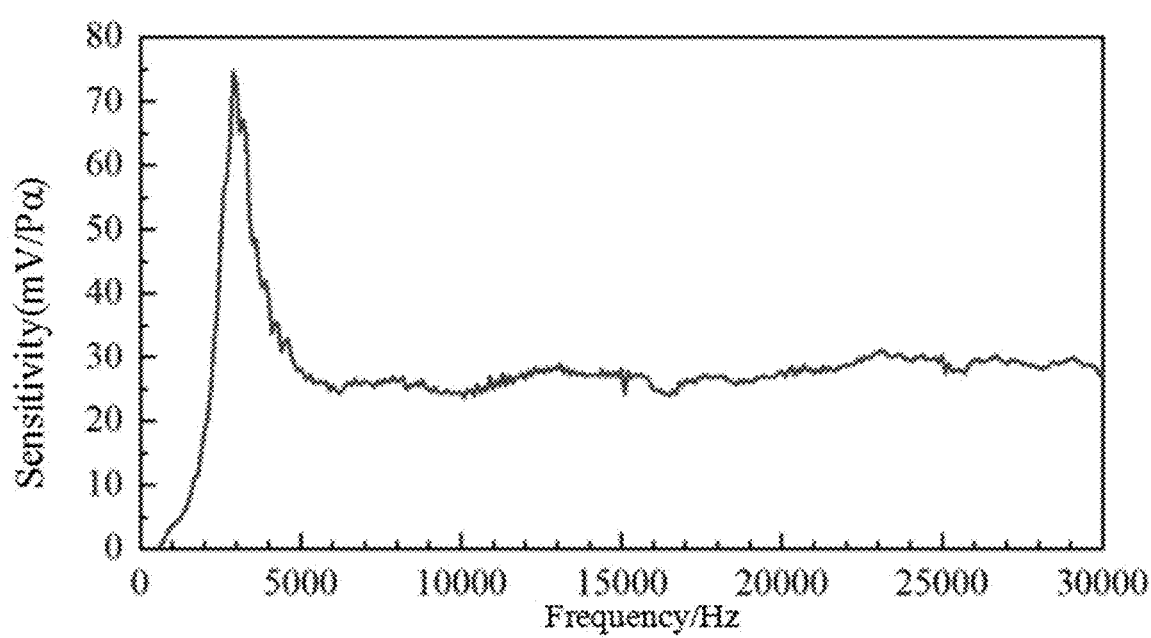
FIG. 7B is a sensitivity curve of a swim bladder bionic amphibious optical fiber ocean acoustic sensor according to the disclosure as a fiber-optic microphone in an air.

As shown in FIG. 6A, the disclosure is a schematic diagram of an experimental device for underwater acoustic test of a swim bladder bionic amphibious optical fiber ocean acoustic sensor. The optical fiber ocean acoustic sensor may be used as a fiber-optic hydrophone to detect underwater acoustic signals by filling a back cavity with water through overflow holes. The sensitivity calibration is performed in a standing wave tube with a standard hydrophone (RESON TC4013), and an optical signal demodulation is performed by a white light interference method. An obtained sound pressure sensitivity curve of the fiber-optic hydrophone is shown in FIG. 6B. An average sensitivity of the fiber-optic hydrophone may reach 155 dB re. V/μPa in an operating frequency range of 10 Hz-4 kHz. As shown in FIG. 7A, a schematic diagram of an experimental device for testing of a swim bladder bionic amphibious optical fiber ocean acoustic sensor in air is provided. The optical fiber ocean acoustic sensor fills the back cavity inside the structure with air through the overflow holes, so the sensor may be used as a fiber-optic microphone used on land for acoustic signal detection in air. In an anechoic chamber, sensitivity of the fiber microphone and a standard MK microphone is calibrated, and the white light interference method is used for the optical signal demodulation. An obtained sensitivity curve is shown in FIG. 7B. At 2900 Hz, a highest sensitivity of the fiber-optic microphone is 74.67 mV/Pa, and an average sensitivity of a working frequency band below 30 kHz may reach 25 mV/Pa.

Figure 8A:
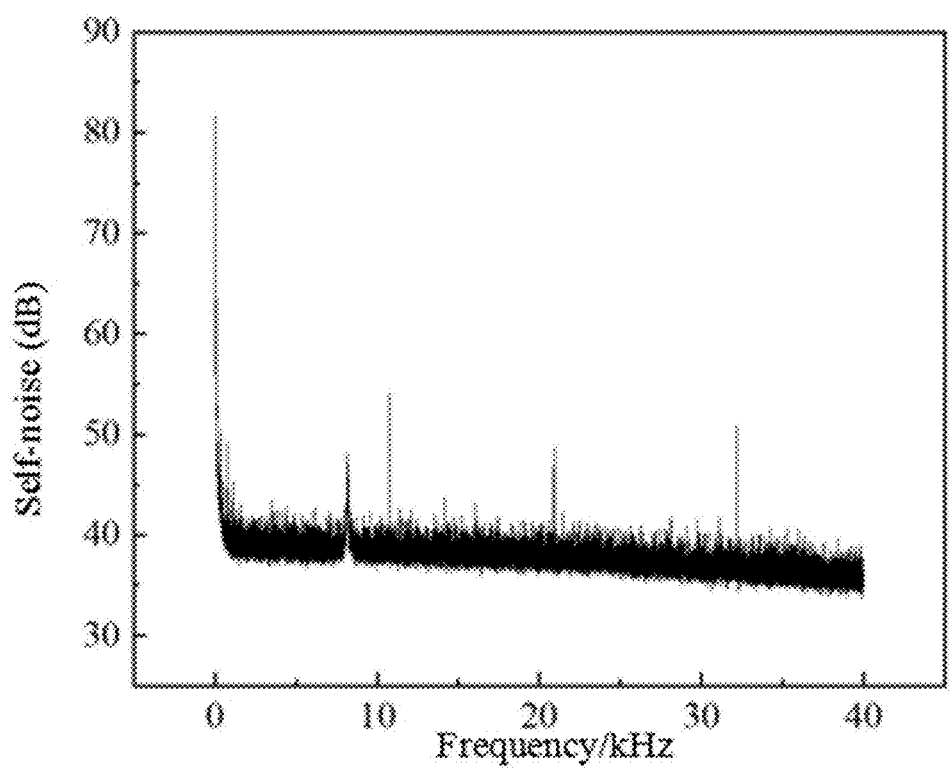
FIG. 8A is a system self-noise curve of a swim bladder bionic amphibious optical fiber ocean acoustic sensor according to the disclosure as a fiber-optic hydrophone.
Figure 8B:
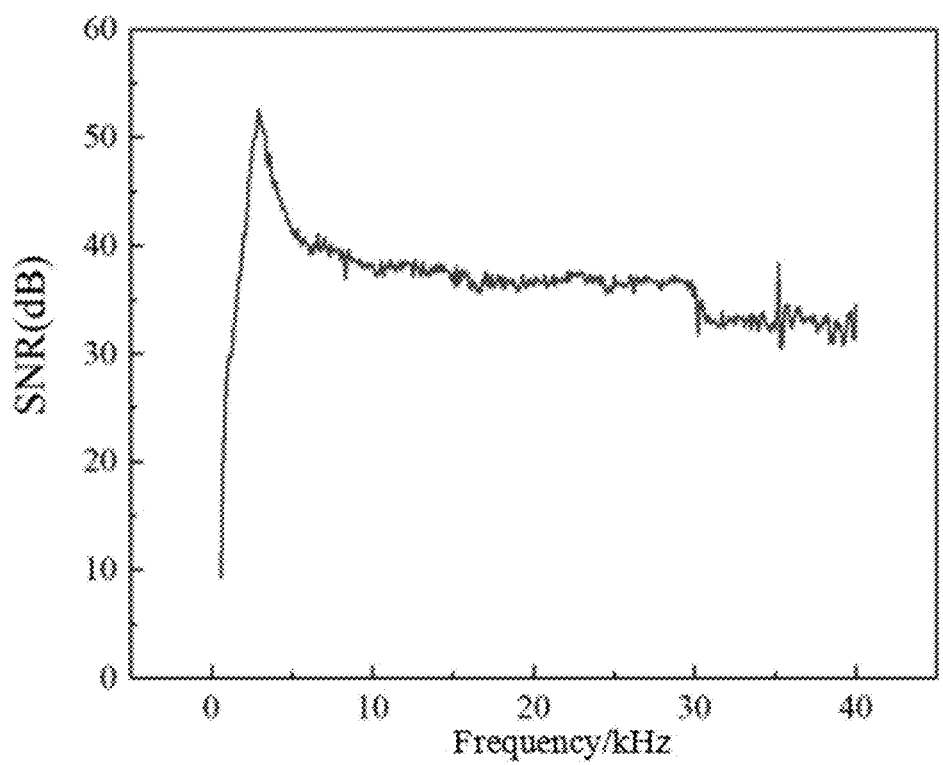
FIG. 8B is a system signal-to-noise ratio curve of a swim bladder bionic amphibious optical fiber ocean acoustic sensor according to the disclosure as a fiber-optic microphone used on land.

FIGS. 8A-8B illustrate system self-noise test curve of a swim bladder bionic amphibious optical fiber ocean acoustic sensor according to the disclosure. Noise signals of the sensor itself are collected in the anechoic chamber when there is no emitter, so as to judge whether the sensor has an ability to detect weak signals. When the sensor works as a fiber-optic hydrophone, its self-noise level is 39.14 dB @1 kHz, which is comparable to a zero-order sea state (see FIG. 8A). When the sensor works as a fiber-optic microphone in air, its self-noise level is 29.01 dB @1 kHz, and a corresponding system signal-to-noise ratio is about 40 dB (see FIG. 8B). These experimental results show that the amphibious optical fiber acoustic sensor has a low system noise level, so it has an excellent weak acoustic signal detection ability.

Figure 9A:
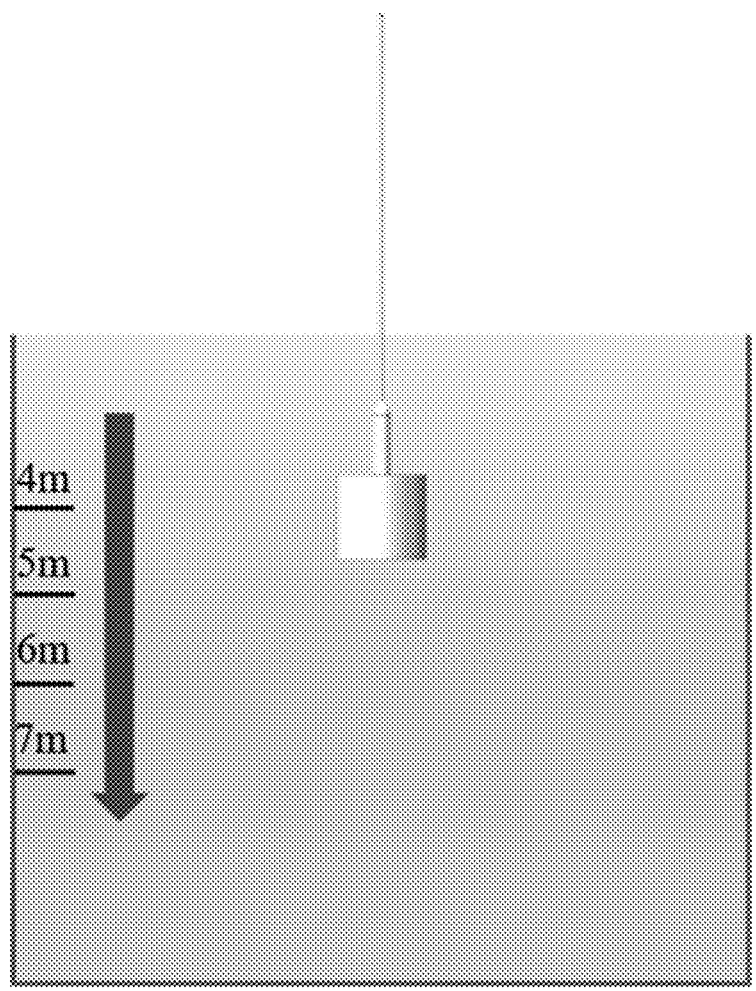
FIG. 9A is a schematic diagram of underwater optical performance stability test experiment of a swim bladder bionic amphibious optical fiber ocean acoustic sensor according to the disclosure.
Figure 9B:
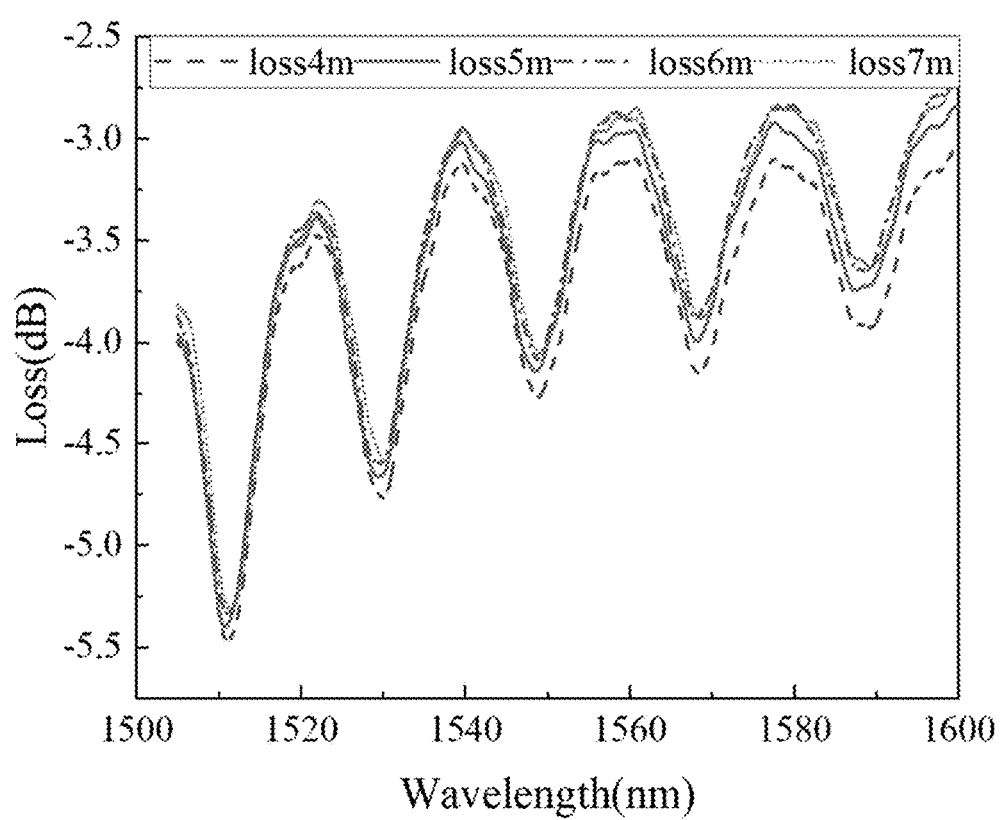
FIG. 9B is a result data diagram of underwater optical performance stability test of a swim bladder bionic amphibious optical fiber ocean acoustic sensor according to the disclosure.

As shown in FIG. 9A, the swim bladder bionic amphibious optical fiber ocean acoustic sensor according to the disclosure is tested for its underwater working stability. In an pool, when an underwater working depth of the optical fiber ocean acoustic sensor is changed, spectral response characteristics of the optical sensor are basically unchanged in an underwater range of 4-7 m (FIG. 9B). This test successfully proves that optical performance of the optical fiber ocean acoustic sensor is very stable underwater and meets requirements of working stably underwater.

Figure 10A:
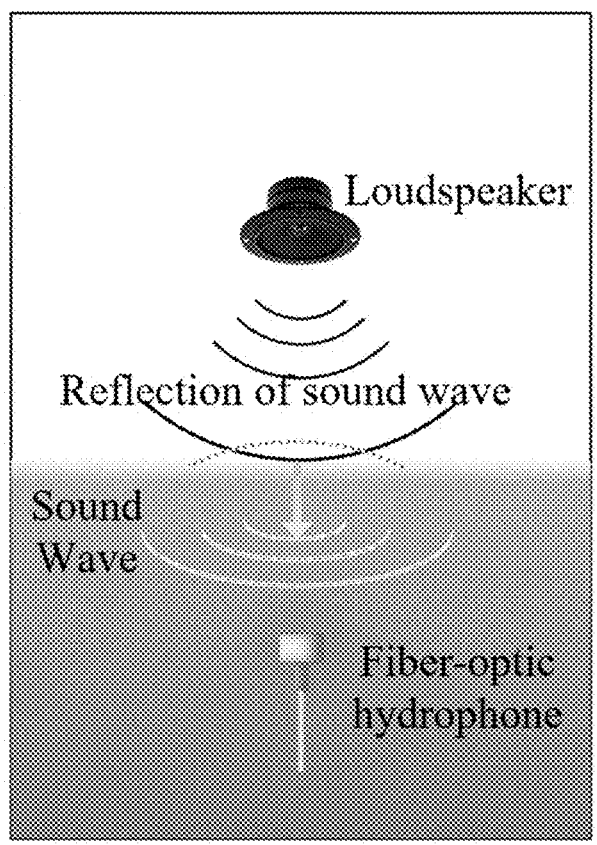
FIG. 10A is an experimental schematic diagram of air-water cross-media acoustic information transmission of a swim bladder bionic amphibious optical fiber ocean acoustic sensor according to the disclosure.
Figure 10B:
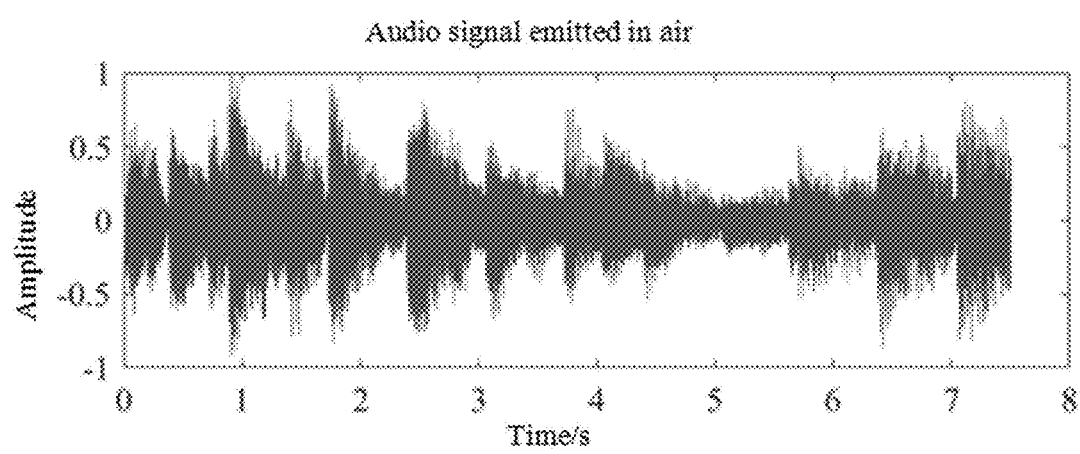
FIG. 10B is a result data diagram of an audio signal emitted in air in a demonstration experiment of air-water cross-media acoustic information transmission of a swim bladder bionic amphibious optical fiber ocean acoustic sensor according to the disclosure.
Figure 10C:
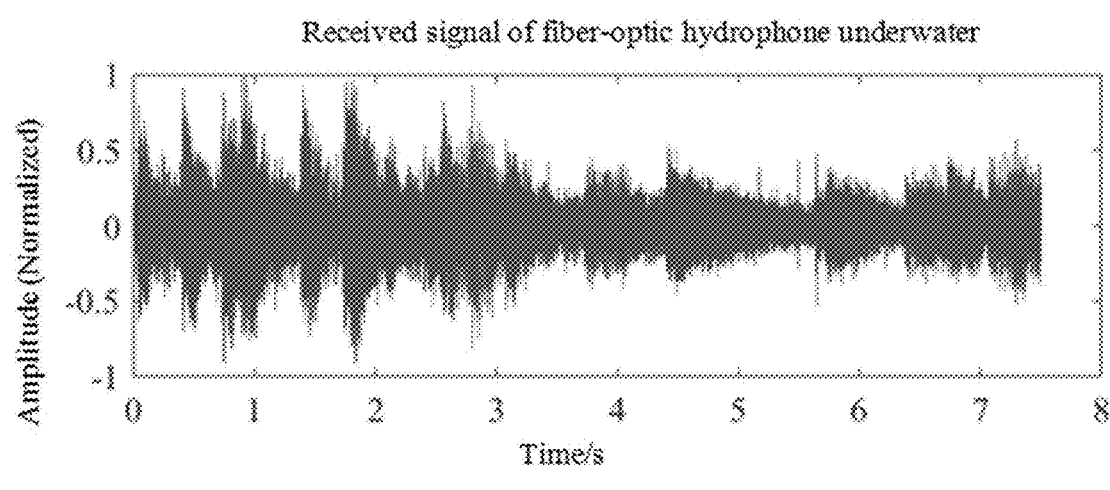
FIG. 10C is a result data diagram of a received signal of a fiber-optic hydrophone underwater in a demonstration experiment of air-water cross-media acoustic information transmission of a swim bladder bionic amphibious optical fiber ocean acoustic sensor according to the disclosure.

A schematic diagram and experimental result diagrams of a demonstration experiment of air-water cross-media communication for an optical fiber ocean acoustic sensor according to the disclosure are shown in FIG. 10A, FIG. 10B, and FIG. 10C respectively. In the demonstration experiment, an audio signal is played in air, and the optical fiber ocean acoustic sensor acts as a fiber-optic hydrophone to receive the signal underwater. The experiment shows that the sensor in water may accurately restore the played audio signal in air. However, due to influence of background noises, an amplitude of the received signal is obviously reduced without signal processing after signal acquisition, while information is basically collected and a good signal reproduction is obtained, thus completing the demonstration experiment of the air-water cross-media communication.

Figure 11A:
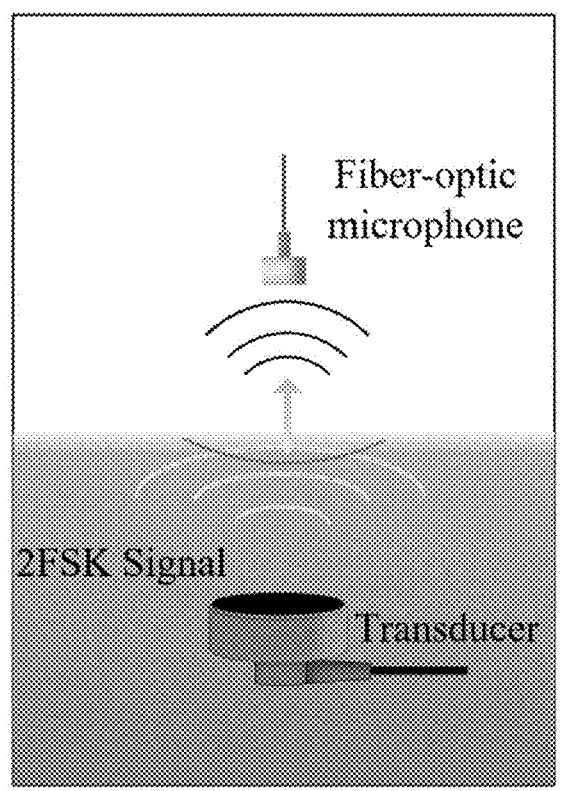
FIG. 11A is an experimental schematic diagram of water-air cross-media Frequency-Shift Keying (FSK) communication of a swim bladder bionic amphibious optical fiber ocean acoustic sensor according to the disclosure.
Figure 11B:
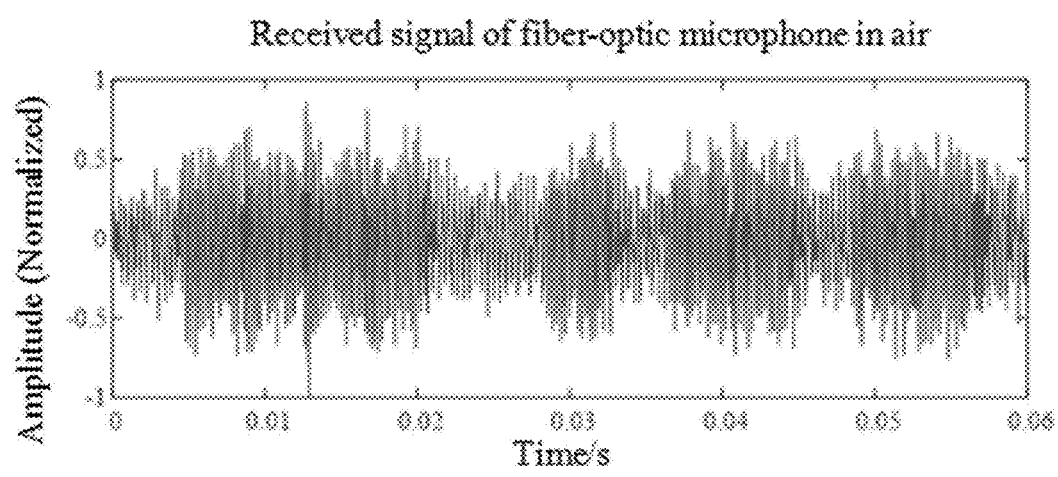
FIG. 11B shows experimental results of a received signal of a swim bladder bionic amphibious optical fiber ocean acoustic sensor according to the disclosure as a fiber-optic microphone in air in the cross-media communication.
Figure 11C:
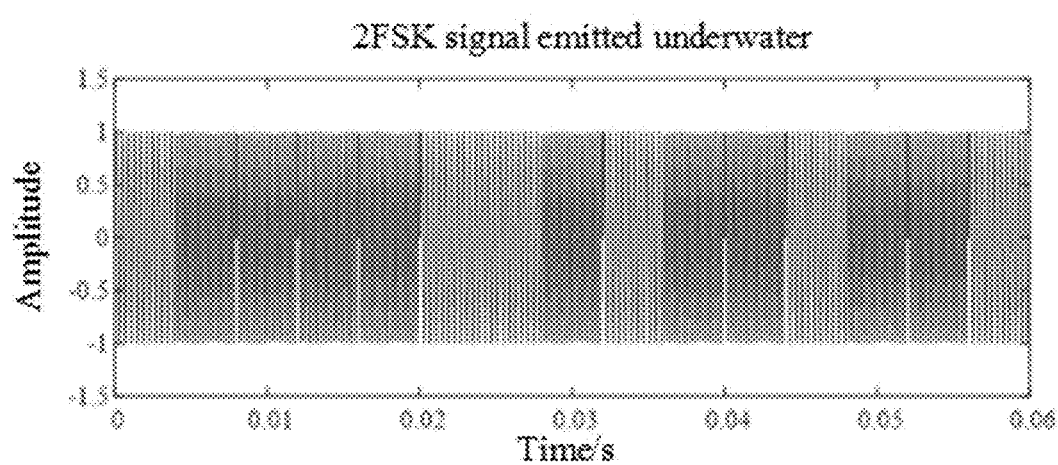
FIG. 11C shows experimental results of a binary Frequency-Shift Keying (2FSK) signal of a swim bladder bionic amphibious optical fiber ocean acoustic sensor emitted underwater according to the disclosure in the cross-media communication.

A schematic diagram and experimental result diagrams of a demonstration experiment of water-air cross-media communication for an optical fiber ocean acoustic sensor according to the disclosure are shown in FIG. 11A, FIG. 11B, and FIG. 11C respectively. A binary frequency shift keying (2FSK) signal (frequencies are 2.5 kHz and 3.6 kHz) is emitted underwater by a disk transducer, and the optical fiber ocean acoustic sensor acts as a fiber-optic microphone to receive the signal in the air. The experiment shows that the sensor may accurately restore the emitted 2FSK signal. However, due to influence of background noises, an amplitude of the received signal is obviously reduced without signal processing after signal acquisition, but information is basically collected and a good signal reproduction is obtained, thus completing the demonstration experiment of the water-air cross-media communication.

Figure 12A:
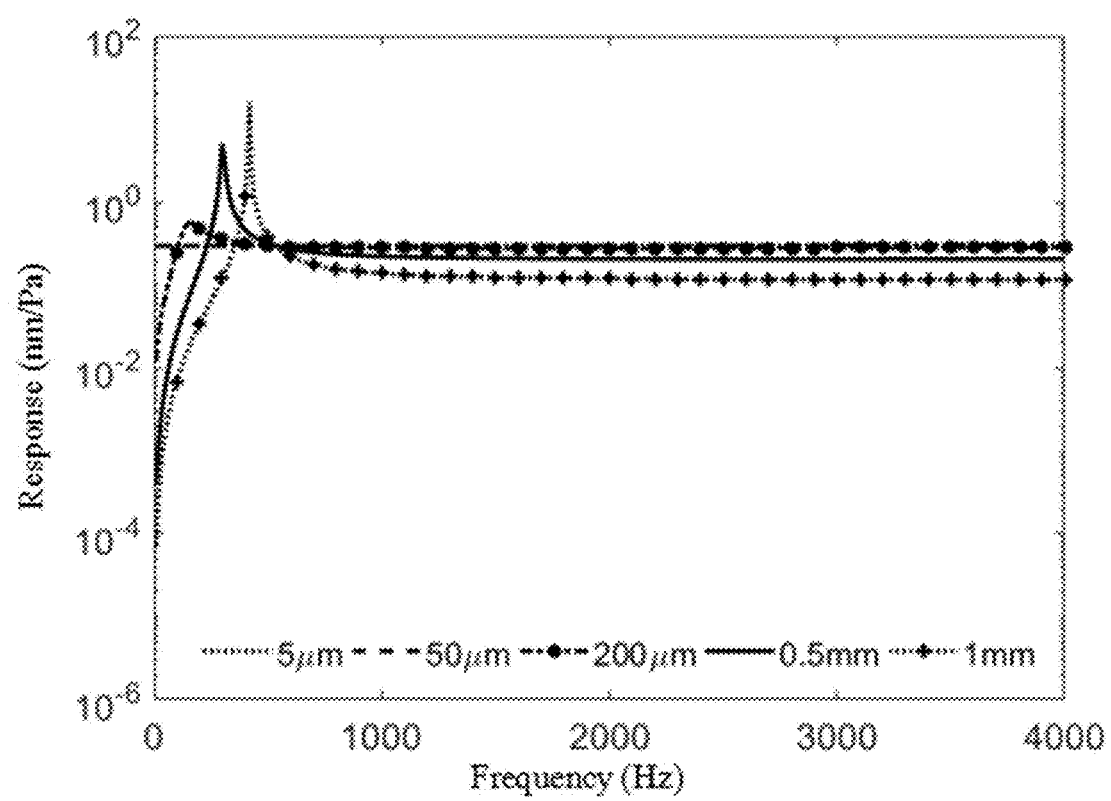
FIG. 12A is a schematic diagram of an influence of changing a diameter of an overflow hole on the acoustic response characteristics of a swim bladder bionic amphibious optical fiber ocean acoustic sensor according to the disclosure.
Figure 12B:
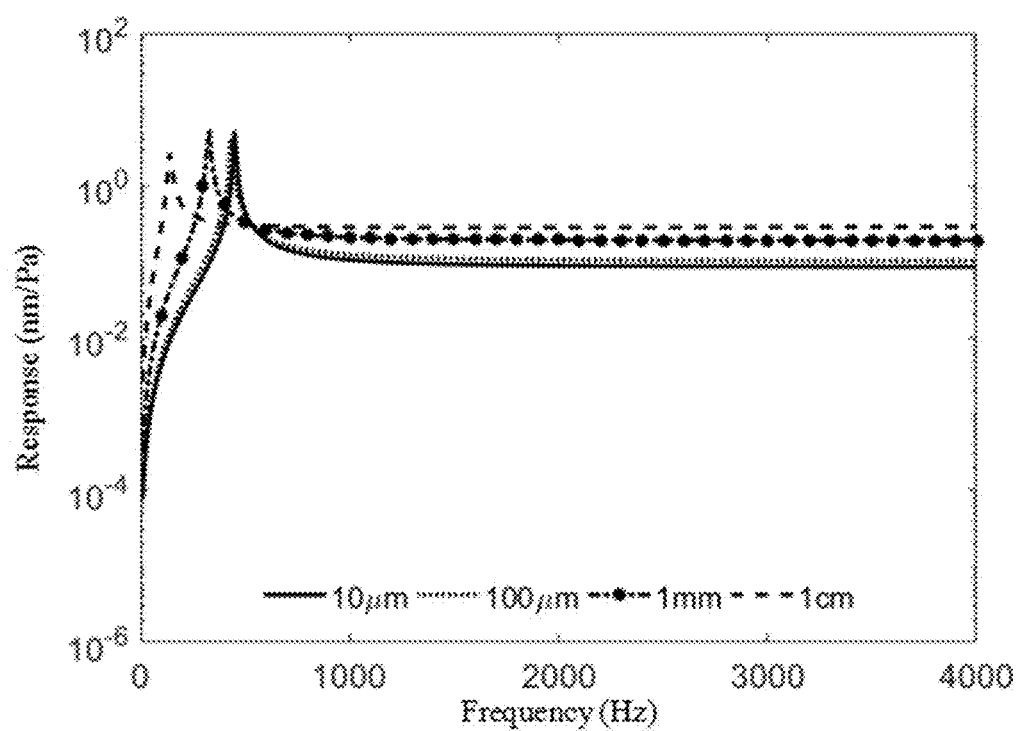
FIG. 12B is a schematic diagram of an influence of changing a hole length of an overflow hole on the acoustic response characteristics of a swim bladder bionic amphibious optical fiber ocean acoustic sensor bionic according to the disclosure.

Effects of changes of a diameter and a hole length of each of overflow holes, a volume of a back cavity and a diaphragm specification of the optical fiber ocean acoustic sensor on a resonance peak of the sensor (corresponding to the maximum sensitivity), according to the disclosure, are shown in FIG. 12A, FIG. 12B, FIG. 12C, and FIG. 12D. FIG. 12A is a transfer response curve calculated only by changing a radius of each of the overflow holes at an initial size. With an increase of the radius of each of the overflow holes, a resonance peak moves to a high frequency, and a mechanical sensitivity in a water environment decreases. In addition, it is found that an excessive aperture may not guarantee the sensitivity of the sensor and an available bandwidth of a required low frequency band. FIG. 12B shows a calculation result of only changing the hole length of each of the overflow holes. With the hole length of each of the overflow holes 3 increasing, a flat bandwidth tends to bass extension, and a transmission response underwater basically remains stable. FIG. 12A and FIG. 12B show simulation results of changing the aperture and the hole length, which are different manifestations of impedance change of an overflow branch in the equivalent circuit model. The simulation results show that reducing the aperture and increasing the hole length of each of the overflow holes may make the sensor have better low-frequency performance. However, in practical application, a too small aperture (micron level) is not convenient for replacement of an internal medium of the sensor and may not meet an amphibious purpose. On the other hand, a large hole length (centimeter level) leads to an increase of sensor size. Therefore, it is more appropriate to choose an overflow hole size of $10^{-1}$ mm level to meet the practical application.

Figure 12C:
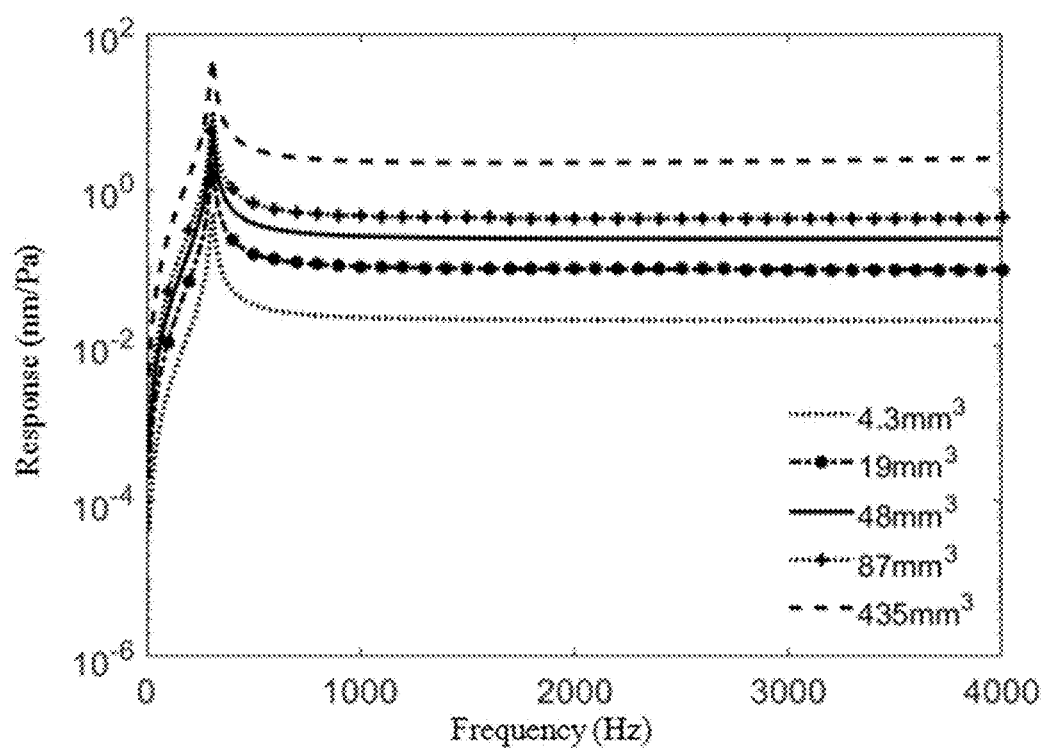
FIG. 12C is a schematic diagram of an influence of changing a volume of a back cavity on acoustic response characteristics of a swim bladder bionic amphibious optical fiber ocean acoustic sensor according to the disclosure.
Figure 12D:
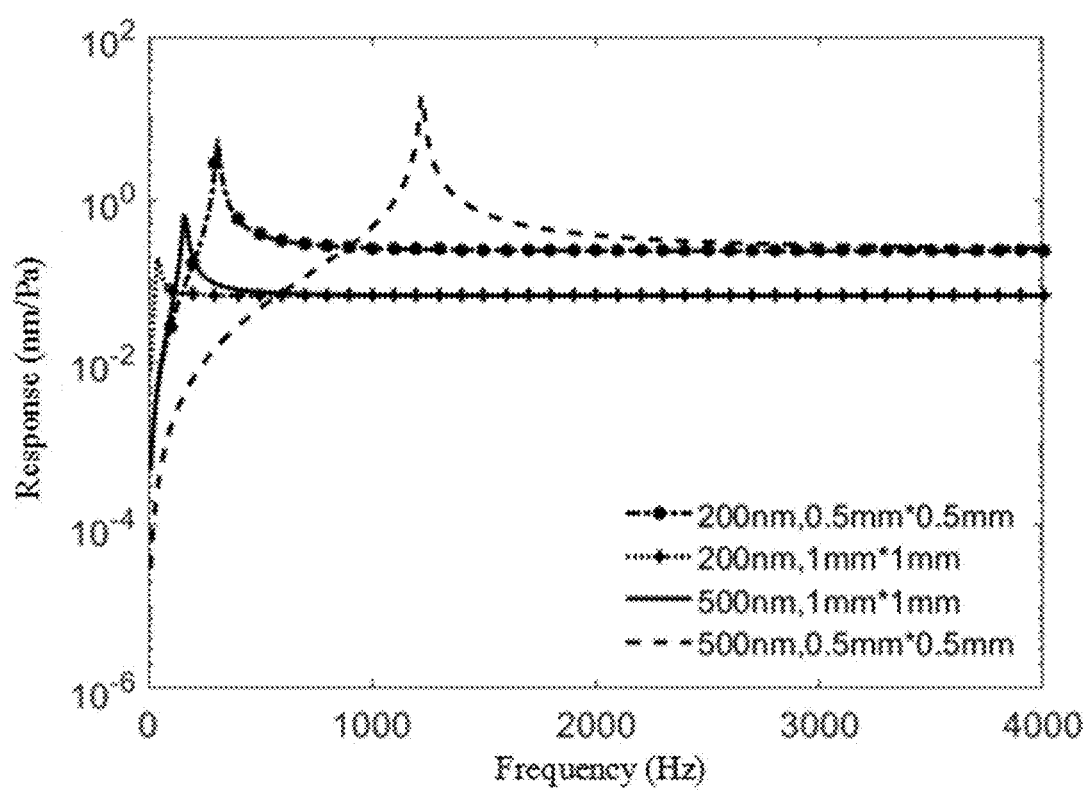
FIG. 12D is a schematic diagram of an influence of changing a diaphragm specification on acoustic response characteristics of a swim bladder bionic amphibious optical fiber ocean acoustic sensor according to the disclosure.

As shown in FIG. 12C, a change of a cavity volume (cavity sound volume) may also affect performance of the sensor. The change of the cavity volume has a little effect on a position of a first underwater resonance peak, allowing the sensor to be further miniaturized. However, too small cavity volume will also lead to a decrease of the sensor sensitivity, as a smaller cavity volume will hinder movement of the medium. Simulation results of common diaphragm specifications are shown in FIG. 12D. For several specifications adopted in the simulation, the thinner and larger the diaphragm, the greater the mechanical compliance. However, radiation impedance of the diaphragm is relatively increased due to a high density of water, and underwater acoustic sensitivity of a large-area diaphragm is not dominant.

A manufacturing method of the swim bladder bionic amphibious optical fiber ocean acoustic sensor is as follows.

The sound sensitive diaphragm 1 and the diaphragm outer frame 2 are glued in the groove at the top of the diaphragm supporting shell 5 by the UV glue, and the top of the diaphragm supporting shell 5 is provided with the two symmetrical overflow holes 3 which are communicated with the internal back cavity 4. The diaphragm supporting shell 5 is processed by three-dimensional (3D) printing. The internal back cavity 4 is an inner cavity of the diaphragm support shell 5, one end of the coated optical fiber 7 extends into the back cavity 4 through the single-hole optical fiber sleeve 6, and the other end of the coated optical fiber 7 is fused with the single-mode optical fiber 8 by the fusion splicer and then communicated with the outside.

The embodiments of the disclosure disclosed above are only used to help explain the disclosure. The embodiments do not describe all details in detail, nor are they limited to specific embodiments described. Many modifications and changes may be made according to contents of this specification. These embodiments are selected and described in detail in this specification in order to better explain a principle and practical application of the disclosure, so that those skilled in the technical field may better understand and utilize the disclosure.

What is claimed is:

1. A swim bladder bionic amphibious optical fiber ocean acoustic sensor, comprising a plurality of overflow holes, a back cavity, a diaphragm supporting shell, a single-hole optical fiber sleeve, a coated optical fiber and a single-mode optical fiber, wherein a groove is arranged at a top of the diaphragm supporting shell, the groove is matched with the diaphragm outer frame, and the diaphragm outer frame is provided with a sound sensitive diaphragm; the top of the diaphragm supporting shell is provided with the overflow holes on an outer side of the groove, the back cavity is located in the diaphragm supporting shell, and the plurality of overflow holes are communicated with the back cavity; the single-hole optical fiber sleeve is installed at a bottom of the diaphragm supporting shell, a head of the coated optical fiber passes through the single-hole optical fiber sleeve and extends into the back cavity, and a tail end of the coated optical fiber is connected with the single-mode optical fiber;

the overflow holes are capable of improving an ability of the sensor to resist hydrostatic pressure underwater, and a medium in the back cavity is capable of being replaced through the overflow holes, so as to realize conversion between different working states of the optical fiber ocean acoustic sensor and to achieve a purpose of amphibious use;

when the back cavity inside the sensor is inflated, the sensor acts as a fiber-optic microphone for acoustic detection and communication in air; when the back cavity inside the sensor is filled with water, the sensor acts as a fiber-optic hydrophone for underwater acoustic detection and communication;

the sound sensitive diaphragm is a square with a size of 0.5 mm×0.5 mm-1 mm×1 mm and a thickness of 200 nm-500 nm, and the diaphragm outer frame is a square with a size of 5 mm×5 mm and a thickness of 200 μm;

the diaphragm supporting shell has an overall diameter of 8 mm-12 mm, a height of 5 mm-10 mm, and the groove at the top has a size of 5.1 mm×5.1 mm×0.2 mm; and a number of the overflow holes is 1-4, each of the overflow holes has a diameter of 0.2 mm-1 mm, a hole length of 0.5 mm-10 mm, and the back cavity has a volume of 20 mm³-400 mm³.

2. The swim bladder bionic amphibious optical fiber ocean acoustic sensor according to claim 1, wherein a working frequency of the sensor is 500 Hz-4 kHz; the sound sensitive diaphragm is a square with a size of 0.5 mm×0.5 mm and a thickness of 200 μm, and the diaphragm outer frame is a square with a size of 5 mm×5 mm and a thickness of 200 μm; the diaphragm supporting shell has an overall diameter of 10 mm, a height of 5.5 mm, and a groove at a top has a size of 5.1 mm×mm×0.2 mm; each of the overflow holes has a diameter of 0.5 mm, a hole length of 1 mm, and the back cavity has a volume of 85 mm³.

3. The swim bladder bionic amphibious optical fiber ocean acoustic sensor according to claim 1, wherein a working frequency of the sensor is 2 kHz-30 kHz; the sound sensitive diaphragm is a square with a size of 0.5 mm×0.5 mm and a thickness of 500 nm, and the diaphragm outer frame is a square with a size of 5 mm×5 mm and a thickness of 200 μm; the diaphragm supporting shell has an overall diameter of 10 mm, a height of 5.5 mm, and the groove has a size of 5.1 mm×5.1 mm×0.2 mm at the top; each of the overflow holes has a diameter of 0.5 mm and a hole length of 1 mm, and the back cavity has a volume of 85 mm³.

4. The swim bladder bionic amphibious optical fiber ocean acoustic sensor according to claim 1, wherein the sound sensitive diaphragm is made of low-stress silicon nitride, and the diaphragm outer frame is made of silicon.

5. The swim bladder bionic amphibious optical fiber ocean acoustic sensor according to claim 1, wherein the diaphragm supporting shell is made of hard plastic or ceramic.

* * * * *